Figure 1:
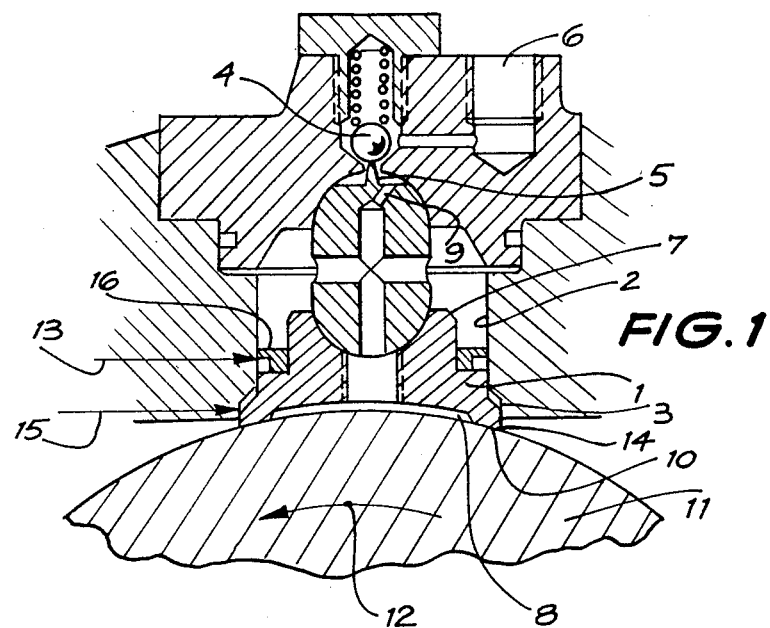

United States Patent [19]

Frazer

[11] Patent Number: 4,540,221

[45] Date of Patent: Sep. 10, 1985

[54] SELF REGULATING HYDROSTATIC PAD BEARINGS

[75] Inventor: Hugh I. Frazer, Lower Portland, Australia

[73] Assignee: Ifield Engineering Pty. Limited, New South Wales, Australia

[21] Appl. No.: 498,454

[22] Filed: May 26, 1983

[30] Foreign Application Priority Data

Jun. 2, 1982 [AU] Australia ............................... PF4259

[51] Int. Cl.³ .............................................. F16C 32/06
[52] U.S. Cl. ..................................... 308/5 R; 384/99; 384/119
[58] Field of Search ................. 308/5 R; 384/99, 100, 384/107, 110–124, 398, 322, 399, 368, 369

[56] References Cited

U.S. PATENT DOCUMENTS

| 3,782,793 | 1/1974 | Sinner | 384/99 |
| 3,791,703 | 2/1974 | Ifield | 384/117 |
| 3,844,186 | 10/1974 | Youden et al. | 308/5 R X |

FOREIGN PATENT DOCUMENTS

| 899172 | 7/1949 | Fed. Rep. of Germany | 384/100 |
| 1382268 | 11/1964 | France | 384/119 |
| 1203842 | 9/1970 | United Kingdom | 308/5 R |

*Primary Examiner*—Stuart S. Levy
*Assistant Examiner*—Thomas R. Hannon
*Attorney, Agent, or Firm*—Edmund F. Bard

[57] ABSTRACT

A hydrostatic pad or slipper bearing that is hydrostatically balanced to provide a substantially frictionless bearing with negligible fluid leakage, for supporting a moving part, in which there is a stationary housing in a cylindrical recess in which is mounted a bearing pad movable in the recess and surrounded by a liquid seal, the outward face of the pad being shaped to bear on the moving part to be supported and having a recessed area in its outward face which is defined by sealing land. A passage through the pad provides a communication between the inward face of the pad and the recessed area. Within the housing is a cylindrical cavity containing a valve assembly which is connected in a manner that is free of back lash to the pad so that the valve moves with the pad. The cylindrical cavity is supplied with liquid under pressure the entry of which is controlled by the valve and also with a passage leading to an area of lower of pressure. The novel feature of the construction lies in the fact that the cylindrical recess and the pad are of substantially uniform diameter through the lengths so that the pad is supported against lateral movement by the wall of the recess at a point close to the moving part and in that the effective hydrostatic area of the inward face of the pad is substantially equal to the effective hydrostatic area of the outward face of the pad plus the effective hydrostatic area of the valve subject to the pressure acting on the inward face of the pad, the valve assembly being hydrostatically balanced within itself with respect to the input pressure so that the whole pad and valve assembly are hydrostatically balanced. This arrangement guards against the leading edge of the pad digging into the moving part and also permits the use of a large diameter poppet valve.

5 Claims, 3 Drawing Figures

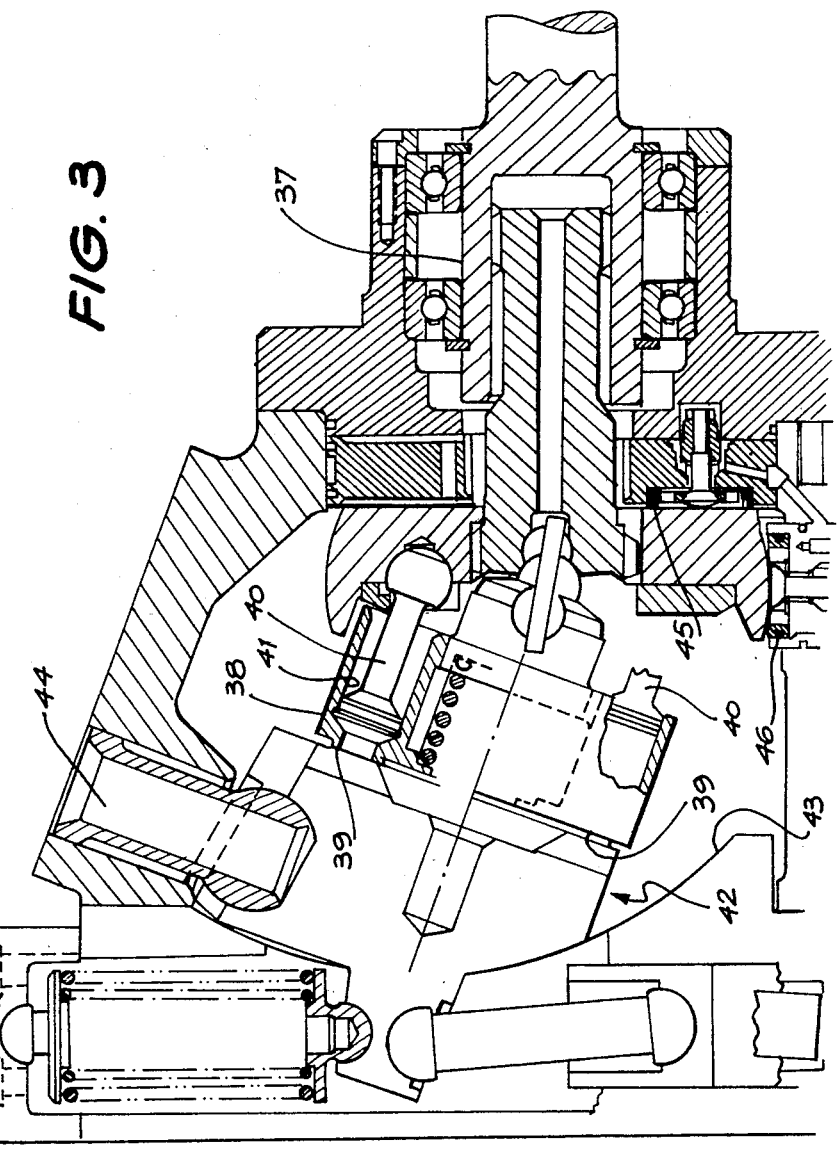

SELF REGULATING HYDROSTATIC PAD BEARINGS

This invention relates to hydrostatic pad or slipper bearings that are hydrostatically balanced to provide a substantially frictionless bearing with negligible fluid leakage. Such bearings are used with position sensing valves to regulate automatically the hydrostatic support pressure to suit a varying load and can be used for thrust and journal loads.

Hydrostatic pad bearings typically consist of a substantially cylindrical pad having a sealed diameter slideably engaged in a fixed housing, the inward face of the pad being supplied with pressure through a valve operated by the position of the pad, the outward face being formed to bear in intimate contact with a moving part to be supported, an area on this outward face being defined by a sealing land to have substantially the same hydrostatic area as the inward face and there being a passage through the pad communicating the pressure acting on the inward face to the defined area on the outward face so that the pad is in a substantial state of balance from pressure forces, the moving part being substantially supported by hydrostatic pressure alone, there being negligible mechanical loading between the pad and the moving part. Throughout this specification the term "inward" is used in relation to the direction away from the part to be supported and the term "outward" in relation to the direction towards the part to be supported.

FIG. 1 of the accompanying drawings is an example of a known pad bearing. Descriptions of other examples are to be found in the specification of U.S. Pat. No. 3,791,703.

Referring to FIG. 1 illustrating a hydrostatic pad bearing of known design, the bearing pad 1 fits into two cylindrical recesses 2 and 3. Inward movement of the pad causes valve 4 to be opened by push rod 5 to admit fluid into the bearing from pressure supply 6. This fluid is communicated to the inward face 7 and outward recess 8 of the pad through passage 9. The recess is formed in a manner to define a sealing land 10 bearing onto moving part 11 having an effective hydrostatic area substantially equal to that of cylindrical recess 2. In practice, this requires that the diameter of recess 2 equals approximately the mean of the outer and inner diameters of the sealing land. This fundamental requirement necessitates that the pad have stepped diameters as illustrated.

Arrow 12 shows the direction of motion of the moving part and there is a slight friction force at the pad face forcing the pad in this direction. If recess 3 is not provided this friction force causes a reaction force as indicated by arrow 13. Because the reaction force is remote from the pad face a couple is generated causing the leading edge of the pad 14 to dig into the surface of the moving part. In order to prevent this occurrence, recess 3 is generally provided in order to support the reaction at arrow 15. However because the pad requires to be a close fit in recess 2 to avoid seal extrusion, the recesses 2 and 3 and the pad have to be made to very close tolerances with resultant high costs. Even then, the reaction load is to some extent supported by the seal 16, again tending to cause the leading edge of the pad to dig in, with a result that this type of design is found to be generally unreliable and unpredictable.

It should also be noted that the supply pressure in passage 6 acting on the ball valve 4 also acts on the pad assembly disturbing the hydrostatic balance of the pad. For this reason only a very small ball valve can be used leading to inadequate support pressure with rapidly fluctuating loads and sensitivity to leakage.

Known designs of pad bearings such as that described above are limited to using either very small poppet type valves if the hydrostatic balance of the pad is not to be impaired, reducing the usefulness of the bearing as it will not respond to rapidly fluctuating loads and being very sensitive to leakage, or spool valves which, although inherently balanced, are prone to leakage and erosion at higher pressures in low viscosity fluids and are prone to jamming if solid particles are present in the fluid supply. For some applications however a spool valve is acceptable.

A further requirement of hydrostatic pad bearings of the kind with which the invention is concerned is that the coupling between the pad and the position sensing valve shall be free of back-lash, that is to say that any movement of the pad should cause an immediate and corresponding movement of the valve.

An object of the present invention is to provide a hydrostatic pad or slipper bearing in which the pad is supported in a single diameter cavity in the housing in a manner such that any tendency of the pad to dig into the moving part is minimized but which avoids the necessity for using a pad of stepped construction. As has been explained in connection with FIG. 1 pad bearings require to be diametrally supported very closely adjacent to the moving part if they are not to tilt and present a sharp leading edge to the surface of the moving part. This is difficult to achieve in known pad designs because the diameter of the outer face has to be greater than the sealing diameter (as is the case in the construction described above) in order to provide the equal hydrostatic areas; and, in order to provide a close support, the outer diameter has to be a close fit in the housing as does the sealing diameter to prevent seal extrusion, but the larger diameter requires to have the closest fit under all tolerance conditions, leading to very close manufacturing tolerances and high production costs.

A further object of the invention is to provide a form of construction in which either a spool valve or a large diameter poppet type valve, preferably the latter, can be used, the valve being connected to the pad in such a manner as to eliminate back-lash. The term poppet type valve is to be taken to include what is described as a face valve 18 in connection with FIG. 2.

The present invention consists in a hydrostatic pad or slipper bearing for supporting a moving part, comprising a stationary housing having a cylindrical recess in the face thereof, a bearing pad fitting closely in said recess and axially moveable therein, liquid sealing means between the periphery of said pad and said recess, the outward face of the pad being shaped to bear on the moving part to be supported, a recessed area on the outward face of the pad being defined by a sealing land, there being a passage through the pad communicating the inward face of the pad with the said recessed area, a cylindrical cavity within the housing inward of the pad, a valve assembly within said cavity connected in a manner that is free of back-lash to the pad for movement of the valve thereof therewith, a first passage in the housing for supply of liquid under pressure to the valve assembly, a second passage connecting the inward part of said cavity to an area of lower pressure, the valve being arranged to open to admit liquid pressure to the said passage through the pad on movement of the pad in an inward direction characterised in that the cylindrical recess and the pad are of substantially uniform diameter throughout their lengths whereby the pad is supported against lateral movement by the wall of the recess at points close to the moving part and in that the effective hydrostatic area of the inward face of the pad is substantially equal to the effective hydrostatic area of the outward face of the pad plus the effective hydrostatic area of the valve subject to the pressure acting on the inward face of the pad and in that the valve assembly is within itself hydrostatically balanced with respect to the pressure in said first passage whereby the pad and valve assembly are hydrostatically balanced.

Figure 2:
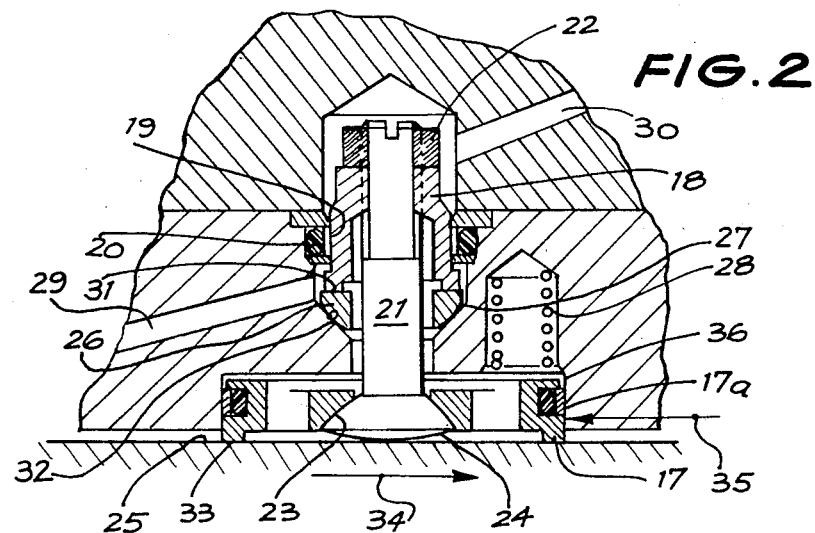

Preferred embodiments of the invention are described by way of example with reference to the remaining drawings, in which:

FIG. 2 shows a pad bearing with a position sensing valve according to the invention, and FIG. 3 shows a variable displacement piston pump incorporating pads according to the invention.

FIG. 2 shows a pad bearing according to the invention. The pad 17 fits into recess 17a and the valve 18 is sealed on cylindrical diameter 19 by seal assembly 20. The valve 18 is attached to the threaded part of rod 21 and locked to an adjusted position by locknut 22. The outward end of the rod 21 is formed into a part sphere for the flexible ball and socket connection 23 to the pad 17. The outward face 24 of the rod 21 is made to be closely adjacent to but not in contact with the face 25 of the moving part. The sealing land 31 of the face valve 18 bears against a valve seat 26 which in turn fits a part-conical recess 27 in the housing. A number of light springs 28 fit into corresponding recesses in the housing and urge the pad 17 outward, causing the ball and socket joint 23 to engage and the sealing land 31 to bear upon the valve seat 26 preventing the fluid supply in passage 29 which is under supply pressure from entering the pad bearing. The inward face of the valve 18 is connected to the low pressure in the housing through passage 30.

The mean diameter of the sealing land 31 of the face valve 18 and the diameter of the line-contact line 32 between the valve seat 26 and the housing are made to be substantially equal to the face valve diameter 19, thus preventing the supply pressure from reacting on the face valve 18 or valve seat 26, the valve assembly being within itself hydrostatically balanced with respect to the supply pressure; thus the valve actuating forces are substantially independent of the supply pressure. As load is applied, the face 25 of the moving part moves the pad 17 inwards and contacts the outer face 24 of the rod 21 to open the valve 18 and admit fluid into the bearing. As soon as there is any pressure in the bearing, this pressure acts against the sealing land 31 of the valve 18 to move the valve 18 and rod 21 inwards and to engage the ball and socket joint 23. The ball and socket joint 23 remains engaged whenever there is pressure within the bearing thus providing a flexible connection free of backlash between the valve 18 and the pad 17. Contact between the face 25 of the moving part and the rod 24 only occurs in the absence of this pressure.

As the pressure rises within the bearing, the hydrostatic force supports the load and moves the face 25 of the moving part away allowing the valve 18 to close. Under steady load conditions the valve 18 will be substantially closed, perhaps metering a small amount of fluid to compensate for pad 17 leakage. A further increase in load will reopen the valve 18 until the pressure within the bearing again reached a value sufficient to support the load.

If the load is descreased, the valve 18 first fully closes and then the pressure within the bearing acts against the face 25 of the moving part and moves it slightly away from the pad 17 to allow the now excessive pressure to bleed away across the pad sealing land 33 until the correct balance pressure is reached.

In normal use, with a dynamic load that is continuously varying, flow is repeatedly fed into the pad bearing to balance an increasing load and subsequently relieved across the sealing land 33 of the pad as the load falls. However, due to the relatively low compressibility of most liquids this intermittent flow is very small and does not represent a significant energy loss.

The friction force on the pad caused by movement as indicated by arrow 34 is resisted closely adjacent to the moving face 25 as indicated by arrow 35 thus minimising the chance of digging in at the leading edge of the pad occurring. It is beneficial to construct the seal retaining lip 36 of the pad with a generous clearance as shown to prevent the friction reaction from being supported by the lip under any circumstances.

In the construction described the pad 17 has a single external diameter and the cavity 17a a single internal diameter avoiding the use of the stepped construction of FIG. 1. With this arrangement however the pad 17 is not itself necessarily hydrostatically balanced as the effective hydrostatic area of the outward face of the pad is less than the effective hydrostatic area of the inward face. Balance is however achieved by reason of the fact that the inward face of the valve 18 is, by means of the passage 30, at the same low pressure as exists generally within the housing. By a suitable choice of the area of the inward face of the valve the hydrostatic pressure across the pad is balanced without the use of a stepped recess in the housing. This is to say the dimension of the pad, the pad sealing land and the valve are chosen so that the outward force on the pad is balanced by the inward force on the valve, thereby placing the pad and valve assembly in a condition of hydrostatic balance, so that the mechanical loading between the pad and the moving part is negligible and substantially only a hydrostatic force acts on the moving part. The inward force of the valve also forcibly engages the ball and socket joint between the pad 17 and the rod 21 preventing any backlash.

A poppet valve, bearing directly onto the housing, may be used in place of the face valve 18 and the valve seat 26. Alternatively a spool valve may be used. While this has the advantage of being inherently hydrostatically balanced it has the disadvantages referred to above, but could be used in some applications.

Referring to FIG. 3 which illustrates two applications of pad bearings according to the invention a variable displacement piston pump has a rotating shaft assembly 37 which drives a cylinder rotor 38 running against an adjustably inclined face 39 causing a number of pistons 40 to reciprocate in cylinders 41 causing fluid to be drawn in and discharged through ports (not shown) formed in face 39. Movement of the port block 42 along circumferential track 43 changes the angle of inclination of face 39 thus changing the piston stroke and the pump delivery. The ports in face 39 are connected to port tubes 44 to permit the fluid to be drawn into and discharged from the piston pump or motor.

The pressure acting on the pistons 40 causes a considerable reaction force to act on a plurality of thrust support bearings 45, and because of the inclined angle of face 39 a smaller reaction force acts upon journal support bearing 46. Both these support bearings are constructed according to the invention as reliable operation at very high efficiency levels is thereby achieved.

The pad bearings 45 use a flat surface on the moving part for thrust support whereas bearing 46 use a spherical surface on the moving part, with a corresponding part spherical surface on the pad, for journal support.

I claim:

1. A hydrostatic pad or slipper bearing for supporting a moving part, comprising a stationary housing having a cylindrical recess in a face thereof, a bearing pad having a periphery, an inward face and an outward face, the inward face of the pad having an effective hydrostatic area, said pad fitting closely in said recess and axially moveable therein, liquid sealing means between the periphery of said pad and said recess, the outward face of the pad being shaped to bear on the moving part to be supported, a recessed area on the outward face of the pad being defined by a sealing land, there being a passage through the pad communicating the inward face of the pad with the said recessed area, a cylindrical cavity having an inward part within the housing inward of the pad, a valve assembly within said cavity connected in a manner that is free of backlash to the pad for movement of the valve thereof therewith, a first passage in the housing for supply of liquid under pressure to the valve assembly, a second passage connecting the inward part of said cavity to an area of lower pressure, the valve being arranged to open to admit liquid under pressure to the said passage through the pad on movement of the pad in an inward direction, the cylindrical recess formed by a wall and the pad being of substantially uniform diameter throughout their lengths whereby the pad is supported against lateral movement by the wall of the recess at points close to the moving part, characterized in that the effective hydrostatic area of the inward face of the pad is substantially equal to the effective hydrostatic area of the outward face of the pad plus the effective hydrostatic area of the valve subject to the pressure acting on the inward face of the pad and in that the valve assembly is within itself hydrostatically balanced with respect to the pressure in said first passage whereby the pad and valve assembly are hydrostatically balanced.

2. A hydrostatic pad or slipper bearing as claimed in claim 1, wherein the valve assembly is a poppet valve or face valve.

3. A hydrostatic pad or slipper bearing as claimed in claim 2, wherein the pad is connected to the valve by means of a stem passing through the pad, the stem having at its outward end a head having a face, the face of which lies in said recessed area and which has inwardly thereof a part spherical convex face that bears on a similar concave face in the pad to form a ball and socket joint.

4. A hydrostatic pad or slipper bearing for supporting a moving part, comprising a stationary housing having a cylindrical recess in a face thereof, a bearing pad having a periphery, an inward face and an outward face, the inward face of the pad having an effective hydrostatic area, said pad fitting closely in said recess and axially moveable therein, liquid sealing means between the periphery of said pad and said recess, the outward face of the pad being shaped to bear on the moving part to be supported, a recessed area on the outward face of the pad being defined by a sealing land, there being a passage through the pad communicating the inward face of the pad with the said recessed area, a cylindrical cavity having an inward part within the housing inward of the pad, a valve assembly within said cavity connected in a manner that is free of backlash to the pad for movement of the valve thereof therewith, a first passage in the housing for supply of liquid under pressure to the valve assembly, a second passage connecting the inward part of said cavity to an area of lower pressure, the valve being arranged to open to admit liquid under pressure to the said passage through the pad on movement of the pad in an inward direction, the cylindrical recess formed by a wall and the pad being of substantially uniform diameter throughout their lengths whereby the pad is supported against lateral movement by the wall of the recess at points close to the moving part, characterized in that the effective hydrostatic area of the inward face of the pad is substantially equal to the effective hydrostatic area of the outward face of the pad plus the effective hydrostatic area of the valve subject to the pressure acting on the inward face of the pad and in that the valve assembly is within itself hydrostatically balanced with respect to the pressure in said first passage whereby the pad and valve assembly are hydrostatically balanced, the pad being connected to the valve by means of a stem passing through the pad, the stem having at its outward end a head having a face, the face of which lies in said recessed area and which has inwardly thereof a part spherical convex face that bears on a similar concave face in the pad to form a ball and socket joint, the valve being a face valve consisting of a cylindrical member adjustably secured to said stem and having at its outward end a flat annular valve face arranged to seat on a similar face associated with the housing, said valve controlling a flow of fluid from said first passage to the passage through the pad, said cylindrical member being surrounded by a sealing means sealing against the wall of said cavity and separating parts of the cavity.

5. A hydrostatic pad or slipper bearing as claimed in claim 4, wherein the said similar face is formed on an inward end of an annular member having on its outward end a part spherical face that seats on a frusto-conical face in the housing.

* * * * *